US012088033B2

(12) United States Patent
Laeng et al.

(10) Patent No.: US 12,088,033 B2
(45) Date of Patent: Sep. 10, 2024

(54) ELECTRICAL PLUG, ELECTRICAL DEVICE, ELECTRICAL PLUG CONNECTION, AND METHOD FOR PRODUCING AN ELECTRICAL DEVICE

(71) Applicant: Bucher Hydraulics AG, Neuheim (CH)

(72) Inventors: Bernhard Laeng, Romanshorn (CH); Thomas Huber, Herisau (CH)

(73) Assignee: Bucher Hydraulics AG, Neuheim (CH)

( * ) Notice: Subject to any disclaimer, the term of this patent is extended or adjusted under 35 U.S.C. 154(b) by 799 days.

(21) Appl. No.: 17/286,117

(22) PCT Filed: Oct. 22, 2019

(86) PCT No.: PCT/EP2019/078683
§ 371 (c)(1),
(2) Date: Oct. 22, 2021

(87) PCT Pub. No.: WO2020/083886
PCT Pub. Date: Apr. 30, 2020

(65) Prior Publication Data

US 2022/0069506 A1 Mar. 3, 2022

(30) Foreign Application Priority Data

Oct. 24, 2018 (DE) ......................... 102018126483.6

(51) Int. Cl.
*H01R 13/44* (2006.01)
*H01R 13/447* (2006.01)
(Continued)

(52) U.S. Cl.
CPC ........... *H01R 13/44* (2013.01); *H01R 13/447* (2013.01); *H01R 13/502* (2013.01); *H01R 43/205* (2013.01)

(58) Field of Classification Search
CPC .... H01R 13/44; H01R 13/447; H01R 13/502; H01R 43/205; H01R 13/53
See application file for complete search history.

(56) References Cited

U.S. PATENT DOCUMENTS 5,588,852 A * 12/1996 Puerner .................. H01R 13/44 439/752
7,824,210 B2 11/2010 Oka et al.
(Continued)

FOREIGN PATENT DOCUMENTS

DE 37 28 456 A1 3/1989
DE 10 2018 109 557 A1 10/2019

*Primary Examiner* — Briggitte R. Hammond
(74) *Attorney, Agent, or Firm* — Muirhead and Saturnelli, LLC

(57) ABSTRACT

An electrical plug forms an electrical plug connection to a coupling that is complementary to the plug. The electrical plug includes a plurality of metal contact elements for electrically contacting an electrical apparatus arranged in a housing, a contact carrier element and a receiving element for receiving the coupling in a receiving space surrounded by the receiving element. The receiving element can be introduced into the housing in a first direction through an opening in the housing. The receiving element, to form the plug, can be brought into engagement in the first direction with the contact carrier element, the contact elements being guided through the contact carrier element and having contact regions which, when the receiving element has been brought into engagement with the contact carrier element, extend into the receiving space, away from the contact carrier element, counter to the first direction.

20 Claims, 9 Drawing Sheets

(51) Int. Cl.
*H01R 13/502* (2006.01)
*H01R 43/20* (2006.01)

(56) References Cited

U.S. PATENT DOCUMENTS

| | | | |
|---|---|---|---|
| 9,787,020 | B2 | 10/2017 | Choi et al. |
| 2011/0053404 | A1 | 3/2011 | Tsuruta et al. |
| 2013/0224969 | A1 | 8/2013 | Harehide et al. |
| 2015/0258905 | A1 | 9/2015 | Fukushima et al. |
| 2021/0057847 | A1 | 2/2021 | Lindkamp et al. |

* cited by examiner

ELECTRICAL PLUG, ELECTRICAL DEVICE, ELECTRICAL PLUG CONNECTION, AND METHOD FOR PRODUCING AN ELECTRICAL DEVICE

TECHNICAL FIELD

The system described herein relates to an electrical connector for forming an electrical plug connection with a coupling which is complementary to the connector and an electrical plug connection having such a connector and a method for producing such an electrical device.

BACKGROUND OF THE INVENTION

Electrical connectors which serve for forming an electrical plug connection with a coupling which is complementary to the connector are known from the prior art.

Connectors of the type in question are also particularly known as panel connectors, i.e. the connectors are not fastened to the ends of electrical lines or cables but are instead installed in a fixed manner in an electrical device, in particular in the housing of an electrical device. In this case, connectors of the type in question particularly represent the male part of the electrical plug connection which they form with the complementary coupling. In this case, the coupling particularly forms the female part of the electrical plug connection.

Connectors of the type in question have a plurality of contact elements for electrically contacting an electrical apparatus arranged in the housing of an electrical device. The contact elements can consist of a metallic material.

Connectors of the type in question have a contact carrier element and a receiving element for receiving the coupling in a receiving space surrounded by the receiving element. This multi-part design comprising at least two parts particularly enables the connectors of the type in question to be easily mounted in the housing. In this case, the contact elements are guided through the contact carrier element. The contact carrier element consists in particular of an insulating material. The contact carrier element having the contact elements can therefore be arranged within the housing whilst the electrical device is being assembled. In a further step, it is then possible to insert the receiving element into the housing along a first direction through an opening in the housing. In this case, the receiving element engages with the contact carrier element and thus forms the connector. The contact elements which are guided through the contact carrier element have contacting regions. The contacting regions serve for electrically contacting complementary contacting regions of the coupling when this is plugged into the connector. The contacting regions extend into the receiving space of the receiving element contrary to the first direction, away from the contact carrier element, when the receiving element has been brought into engagement with the contact carrier element.

With such connectors, the problem of assembling the connector in a housing, in particular in a housing having very limited space, can be solved relatively advantageously. The overall contacting of the electrical device with the connector can take place independently of the connection of the receiving element to the housing. In practice, this represents a substantial simplification, particularly in view of the fact that the electrical connector often needs to be adequately sealed against dirt and/or liquids which could penetrate into the housing in the region of the electrical connector.

In connectors of the type in question, however, the problem arises that the contacting regions projecting into the receiving space may be live. This represents a risk to a person for whom a body part, for example a finger, penetrates into the receiving space. In connectors of the type in question according to the prior art, this risk is counteracted by electronic monitoring of a cover of the connector. This ensures that the contacting regions are not live when the cover is removed. However, this is both complex and prone to faults.

SUMMARY OF THE INVENTION

The system described herein is therefore based on the object of demonstrating an electrical connector of the type described above, an electrical device having such a connector and a method for assembling such an electrical device, in which reliable touch-protection of the connector is ensured by means of a cost-effective solution.

The object is achieved by an electrical connector, an electrical plug connection, an electrical device and a method for producing an electrical device described herein.

The connector which is illustrated and described has at least one touch-protection element, which is arranged in the receiving space when the receiving element is brought into engagement with the contact carrier element. The touch-protection element is designed to prevent a human body part which penetrates into the receiving space from touching the contacting regions of the connector.

Body parts which inadvertently penetrate into connectors of the type in question are typically human fingers. In practice, these have a certain minimum diameter. A touch-protection element which is designed to prevent a human body part which penetrates into the receiving space from touching the contacting regions is therefore understood to refer in particular to a touch-protection element which is designed to prevent a sold foreign body with a minimum diameter of 12.5 mm which penetrates into the receiving space from touching the contacting regions. According to DIN EN 605229, a solid foreign body having these dimensions corresponds to a finger where access to dangerous parts is concerned.

In this case, the task of preventing the human body part from touching the contacting regions can be assigned to a plurality of touch-protection elements. This particularly means that, in terms of its effect as an access barrier, a single touch-protection element does not have to cover the entire receiving space on its own. Instead, a plurality of touch-protection elements can also be arranged in the receiving space so that, overall, a barrier is produced which reliably keeps a human body part away from the contacting regions.

Therefore, a touch-protection element can be configured in such a way that the touch-protection element extends finger-like contrary to the first direction. The touch-protection element projects into the receiving space preferably, at least substantially, parallel to the contacting regions of the contact elements. The touch-projection elements, configured in a finger-like manner, preferably extend further into the receiving space than the contacting regions of the contact elements contrary to the first direction. In particular, a plurality of touch-protection elements can form a barrier comprising individual obstacles for a penetrating body part which are, in particular, configured in an at least substantially punctiform manner.

It is advantageously possible that the at least one touch-protection element or at least one further touch-protection element is a component of the receiving element. This particularly means that the corresponding touch-protection element is inserted into the housing with the receiving element during the assembly of the electrical connector. As a result, the touch-protection elements do not take up any space within the housing until the insertion of the receiving element into the housing and therefore do not constitute a hindrance, in particular during assembly procedures. It is possible to form the touch-protection elements in one piece with the receiving element, for example as a one-piece injection-molded part and/or plastic part. The receiving element can have, for example, a wall which faces the contact carrier element and on which at least one touch-protection element is received or which is formed in one piece with the at least one touch-protection element. This wall can expediently have openings through which the contacting regions of the contact elements can enter the receiving space. Alternatively and/or additionally, however, the touch-protection elements can likewise be formed as a component of the contact carrier element and/or in one piece with the contact carrier element.

Alternatively and/or additionally, at least one touch-protection element can form an electrically non-conductive end region of a contact element. In connectors which are formed in this way, this end region faces contrary to the first direction. In this respect, an end region likewise represents a barrier against a penetrating body part. The contacting region lying behind the end region along the first direction cannot be reached by the body part along the first direction since this is thus prevented by the end region. The end region can be formed from plastic. It can be a solid, electrically non-conductive portion and/or an electrically non-conductive coating.

It goes without saying that the connector can have a plurality of similarly and/or differently configured touch-protection elements of the types described above.

When forming the electrical plug connection, the at least one touch-protection element and/or at least one further touch-protection element is preferably received in a receptacle of the coupling which is complementary to the touch-protection element when the coupling is plugged into the connector. This enables the touch-protection elements to be designed as rigid elements, for example elements which are immovable relative to the connector. It is thus possible to dispense with complex mechanisms which ensure that the touch-protection elements clear the receiving space for the coupling to reach into the receiving space when the coupling is plugged into the connector. Moreover, the touch-protection elements can assume a mechanical guide function with regard to the coupling when the coupling is inserted into the connector. This can be useful, for example, to ensure that the coupling engages securely with the contact regions in the intended manner and does not "tilt", for example, when inserted into the receiving space.

The receiving element can furthermore have a movable cover. The receiving space can be optionally opened and closed by such a cover. Such a cover on the one hand offers additional protection against dirt and spray water, for example; on the other, the cover forms an additional obstacle to unintentional penetration by body parts. The cover can be particularly advantageously designed to secure the coupling received in the receiving space against removal along the first direction. To this end, the cover can have a securing element, which is designed to cooperate with the coupling. Therefore, the securing element can be, for example, a projection which is designed to reach behind a suitable contour of the coupling. It is advantageous if an elastic restoring force is applied to the cover, which transfers the cover to a closed state, i.e. the state in which the cover closes the receiving space. Such an application of force is, in particular, also advantageous in order to hold a securing element in engagement with the coupling. It goes without saying that it is likewise possible to provide a corresponding securing element on the coupling, which acts on a suitably configured contour of the cover.

The connector which is illustrated and described can have a first sealing element for sealing between the receiving element and the housing and a second sealing element for sealing between the receiving element and the contact carrier element. In this regard, the sealing elements are separate components. As a result of this use of two sealing elements, the individual sealing elements themselves can be configured much more simply than the complex sealing elements known according to the prior art. Overall, this can therefore result in a substantially simpler construction of the connector whilst gaining freedom of design in terms of the precise spatial configuration of the receiving element, which can be exploited, in particular, to enable a more compact construction of the connector.

Alternatively and/or additionally, the connector can have a common sealing element with a comparatively complex configuration, in particular made from an elastic material, which is pulled onto the receiving element. This sealing element ensures the sealing of the receiving element both with respect to the housing and with respect to the contact carrier element.

It goes without saying that a corresponding electrical connector can also have further seals, particularly if the receiving element and/or the contact carrier element have a multi-part configuration.

In this regard, the connection between the receiving element and the contact element assumes a particular significance in that the connection can be configured in a way which is advantageous for the system described herein. Therefore, the receiving element can have a plug-in portion and the contact carrier element can have a plug-on portion which is complementary to the plug-in portion. The plug-in portion and the plug-on portion can be plugged together, in particular parallel to the first direction. The receiving element can thus be brought into engagement with the contact carrier element by plugging the plug-in portion and the plug-on portion together. Alternatively, it is also possible that the contact carrier element has the plug-in portion and the receiving element has the plug-on portion.

The plug-in portion and the plug-on portion can be configured in particular in the manner of tubular portions, which are pushed inside one another. The plug-in portion and/or the plug-on portion can have an oval cross-section. It is particularly advantageous if the plug-in portion and/or the plug-on portion has a bearing surface orientated towards the other portion in each case and bearing against the other portion in each case. The bearing surface is preferably orientated in such a way that one of its main directions of extent runs parallel or at least approximately parallel to the first direction. The connector can be configured in such a way that the bearing surfaces slide against one another when the plug-in portion and the plug-on portion are plugged together, so that an overlap between the plug-in portion and the plug-on portion is formed in the region of the bearing surface.

Such a configuration in particular offers the advantage that, when mounting the receiving element in the housing, its position relative to the housing and the contact carrier element along the first direction can be specified relative to the housing. This can be realized, for example, by a stop which prevents further insertion of the receiving element into the housing beyond a certain position along the first direction. Possible tolerances in the relative position of the contact carrier element and the housing with respect to one another along the first direction can be compensated by the configuration of the connector with the plug-in portion and the plug-on portion. For example, depending on the position of the actual relative position in the tolerance zone, it is possible that the plug-in portion may reach further into the plug-on portion or not so far into the plug-on portion.

In particular, the first sealing element or the second sealing element can be an O ring. This can consist in particular of a rubber elastic material. This can consist in particular of a rubber elastic material. Such O rings are advantageous in that they are available as standard parts and can therefore be used cost-effectively. It has surprisingly been shown that reliable sealing can likewise be achieved with simple O rings when the sealing function, as described above, is assigned to both sealing elements.

The first sealing element can be a flat seal. A flat seal provides a comparatively large sealing surface. For example, this enables the position of the receiving element relative to the housing to be varied in a direction perpendicular to the first direction, for example in order to compensate tolerances in the relative position between the contact carrier element and the housing without thereby impairing the function of the seal.

The receiving element can have a bearing surface facing in the first direction for bearing against the housing and/or the first sealing element. In particular, the bearing surface enables the position of the receiving element relative to the housing along the first direction to be specified in that the bearing surface acts as a stop when the receiving element is inserted into the opening of the housing. The bearing surface can be arranged on the receiving element such that the bearing surface surrounds the receiving space. This is therefore particularly advantageous since the first sealing element can then be arranged between the housing and the bearing surface and, in this case, enables circumferential sealing around the plug connection.

In the case of the electrical apparatus to which the contact elements are electrically connected, the electrical device according to the system described herein is a circuit carrier element. The circuit carrier element can be a printed circuit board, for example. The contact elements can be connected to the circuit carrier element in a mechanically fixed manner.

The contact carrier element is arranged in the housing in a stationary manner. This can be achieved in particular in that the contact carrier element is mechanically connected to the circuit carrier element and the circuit carrier element is in turn received in the housing, in particular connected to the housing, in a stationary manner. The receiving element is inserted through an opening in the housing along the first direction and brought into engagement with the contact carrier element, whereby the connector is formed.

The receiving element can, for example, be fixed on the housing by means of suitable fastening elements. For example, the receiving element can be fastened on the housing by means of screws. In this case, but also in alternative configurations for fastening the receiving element on the housing, the sealing element can be squeezed between the receiving element and the housing along the first direction. In this regard, squeezing is particularly understood to refer to an elastic deformation or partial elastic deformation. The elastic pressure forces thereby generated between the sealing element and the receiving element or between the sealing element and the housing create an effective seal.

The second sealing element can be accordingly squeezed transversely to the first direction between the sealing element and the contact carrier element. In particular, the second sealing element can be squeezed between the plug-on portion and the plug-in portion. Squeezing the second sealing element transversely to the first direction is advantageous in that, when the receiving element is brought into engagement with the contact carrier element along the first direction, for example as a result of plugging the plug-in portion and the plug-on portion together, the degree of squeezing of the second sealing element—and therefore the sealing effect—can be independent of the relative end position of the receiving element and the contact carrier element with respect to one another. It is thus possible to make use of the tolerance compensation (already described above) along the first direction, whilst a squeezing of the second sealing element can also take place, which results in correspondingly good sealing.

The contact carrier element and/or the receiving element, in particular the plug-on portion and/or the plug-in portion, can have a groove for receiving the second sealing element. Such a groove can prevent slipping in or on the respective component. The groove can extend in particular orthogonally to the first direction. In such a case, the groove ensures that the second sealing element remains in an intended position of the second sealing element relative to the receiving element and/or the contact carrier element when the two elements are brought into engagement with one another.

The electrical device can be a converter and/or an inverter. In particular, the electrical device can be a converter and/or invertor for use in a motor vehicle. Electrical devices installed in motor vehicles are generally exposed to adverse environmental conditions, for example in an engine compartment; i.e. the seal plays a particular role here. At the same time, the installation space is often limited, which is why, in terms of their dimensions, housings must take up as little installation space possible. The connectors described above, which can be constructed in a particularly space-saving manner, can be used particularly advantageously therein. In particular, this can refer to an ancillary unit inverter. Ancillary unit inverters serve to supply electric energy to drives which do not serve directly for the movement of the motor vehicle.

The contact elements can be connected to the direct voltage circuit of the converter and/or inverter. Such direct voltage circuits can be designed for voltages of up to to 600 volts, in particular up to 1000 volts, during their intended use. In particular, with regard to the penetration of moisture, reliable sealing is therefore advantageous in these cases.

During the production of the electrical device, the contact carrier element and the contact elements can be connected to the circuit carrier element and the circuit carrier element can be incorporated in the housing. It is essentially possible for the contact elements and/or the contact carrier element to be connected to the circuit carrier element when the circuit carrier element is already incorporated in the housing. In this case, "incorporation in the housing" is understood to refer, in particular, to the production of a fixed connection between the circuit carrier element and at least one housing part. However, it is particularly advantageous if the contact carrier element and the contact elements are firstly connected to the circuit carrier element and then connected to at least part of the housing. The advantage consists in particular in the easier handleability of the circuit carrier element prior to its installation in the housing, in particular within the framework of automated production.

After the connection of the contact elements and the contact carrier element to the circuit carrier element, and in particular after the incorporation of the circuit carrier element in the housing, the receiving element is inserted into the housing through a corresponding opening in the housing. In this case, the receiving element engages with the contact carrier element and therefore forms the connector.

BRIEF DESCRIPTION OF THE DRAWINGS

Further practical embodiments and advantages of the system described herein are described below in connection with the drawings, in which.

DESCRIPTION OF VARIOUS EMBODIMENTS

Figure 1:
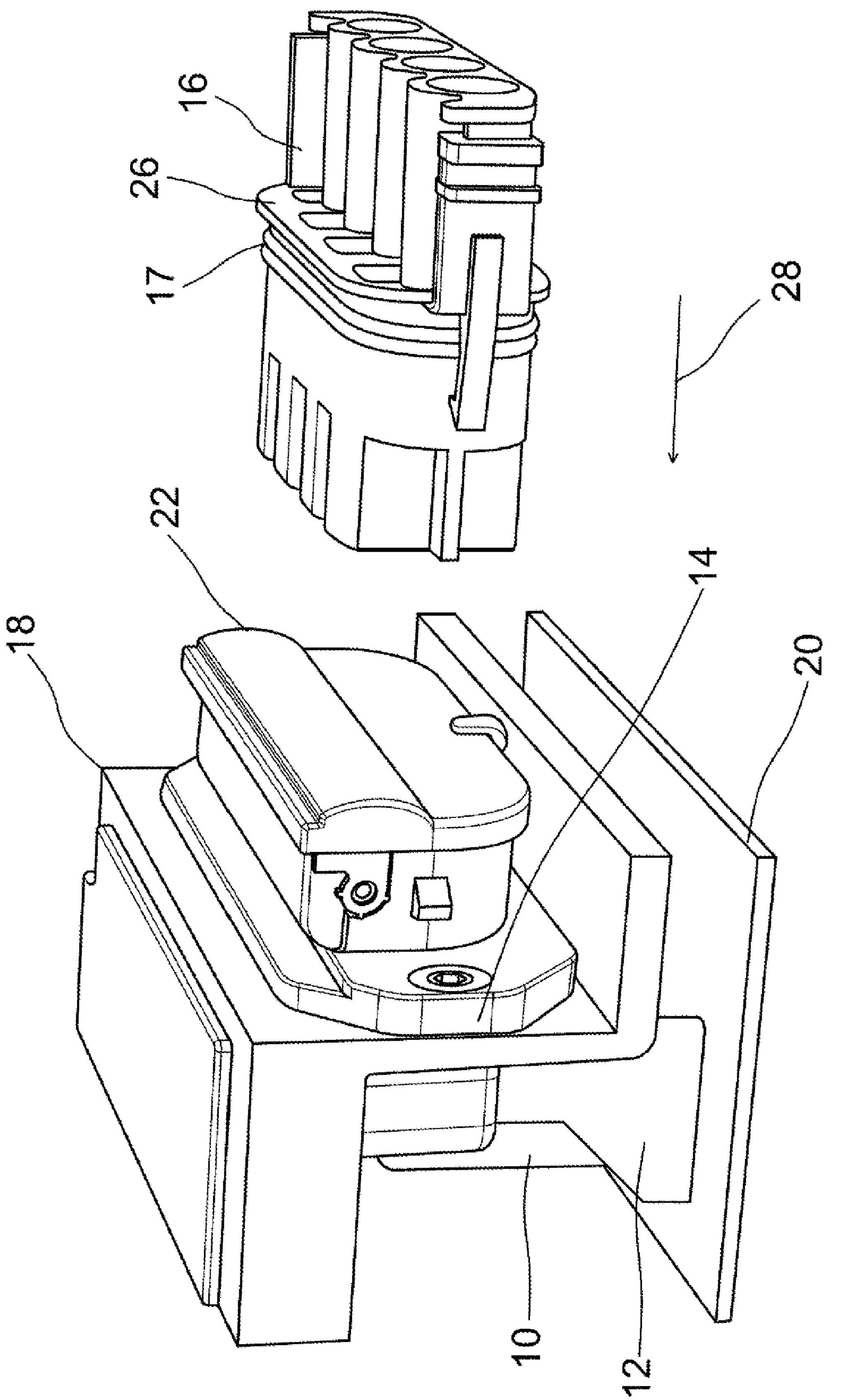
FIG. 1 shows an exemplary connector with a matching coupling in a perspective illustration.
Figure 2:
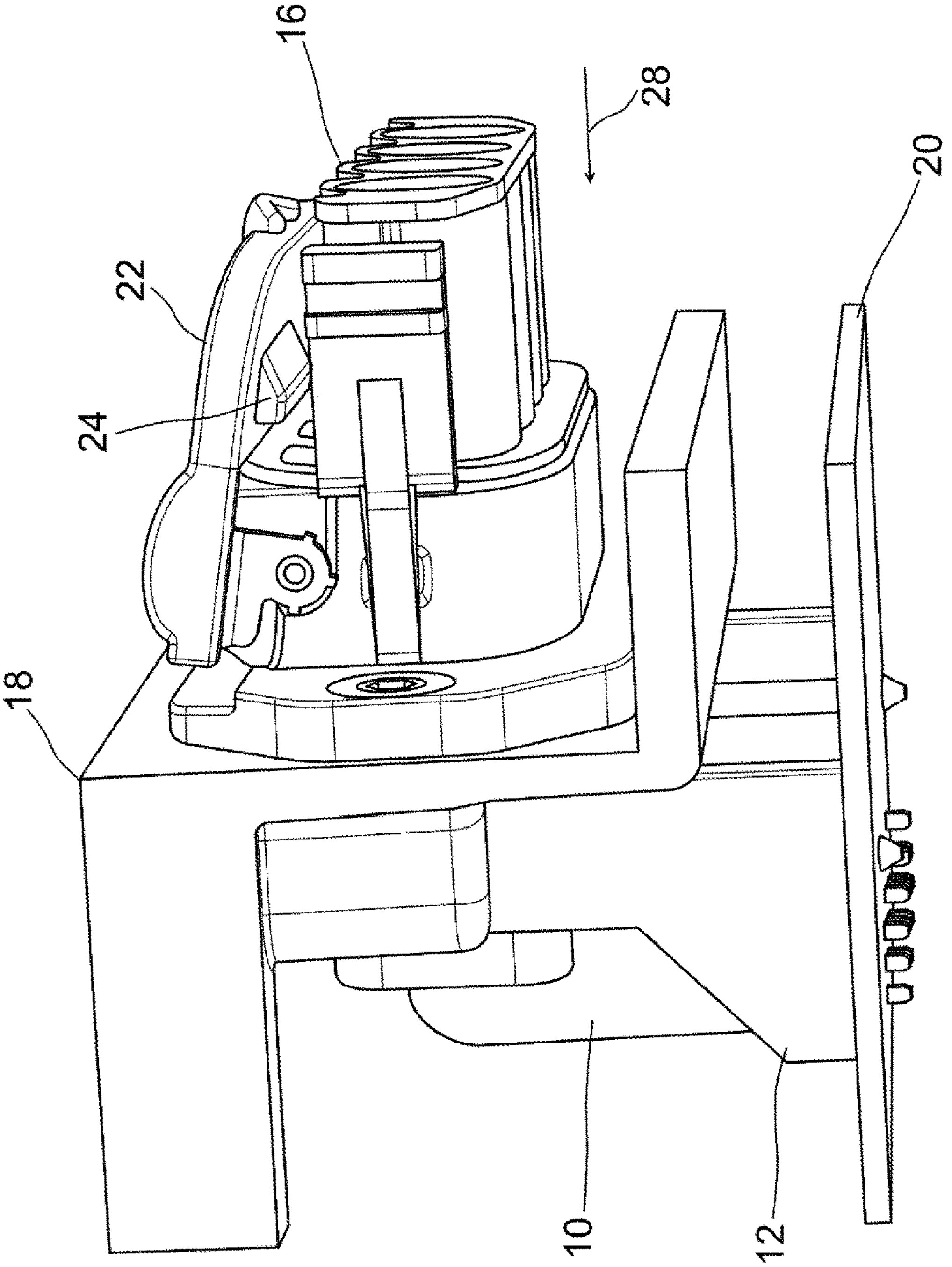
FIG. 2 shows the connector and the coupling of FIG. 1 with the coupling plugged into the connector.

The exemplary connector illustrated in FIGS. 1 and 2 has a plurality of contact elements 10, a contact carrier element 12 and a receiving element 14 and serves to form an electrical plug connection with the coupling 16 (illustrated by way of example) which is complementary to the connector. The plug connection can have a seal 17, in particular made from an elastic material, between the coupling 16 and the connector.

Figure 3:
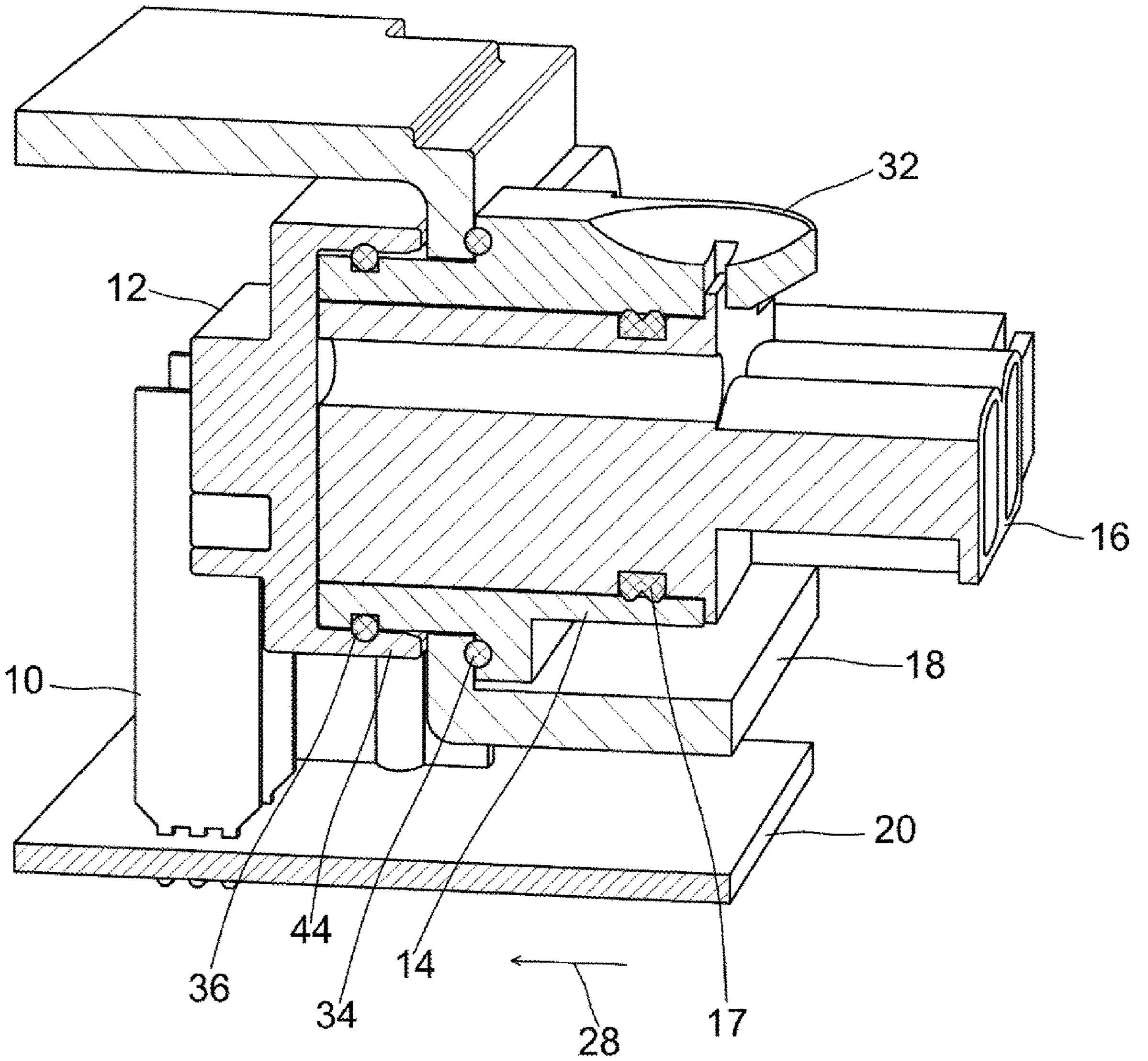
FIG. 3 shows a perspective sectional illustration through a further exemplary connector with a plugged-in coupling.

The contact elements 10 and the contact carrier element 12 are arranged within a housing 18 of an exemplary electrical device. For greater clarity, only a detail of the housing 18 is illustrated in FIGS. 1, 2 and 3. The contact elements 10 and the contact carrier element 12 are connected to an electrical apparatus, such as the circuit carrier element 20, which may be a printed circuit board.

The connector can have a movable cover 22. The cover 22 is illustrated in the closed state in FIG. 1. The cover can have a securing element 24 which can reach behind a suitable contour 26 of the coupling 16, as illustrated by way of example in FIG. 2. The coupling 16 is thus secured against unintentional removal from the connector.

To form the electrical plug connection, the coupling 16 is inserted along the first direction 28 into the receiving space, which is surrounded by the receiving element 14. In this case, the contact regions 30 of the connector come into contact with complementary contact regions 30 of the coupling and form an electrical connection therewith.

An exemplary connector with a plugged-in coupling 16 is shown in FIG. 3. As in the case of the embodiment shown in FIG. 2, the connector can have a securing element 32, which cooperates with the coupling in order to prevent unintentional removal of the coupling 16. As in the example shown, the securing element 32 can be a component of the receiving element 14, in particular formed in one piece with the receiving element 14.

As can be seen in FIG. 3, the connector shown by way of example can have a first sealing element 34 and a second sealing element 36. The first sealing element 34 is arranged between the housing 18 and the receiving element 14. The first sealing element 34 can be squeezed there along the first direction 28 as in the example shown.

The second sealing element 36 is arranged between the receiving element 14 and the contact carrier element 12. As illustrated by way of example in FIG. 3, the second sealing element 36 can be squeezed orthogonally to the first direction 28.

Figure 4:
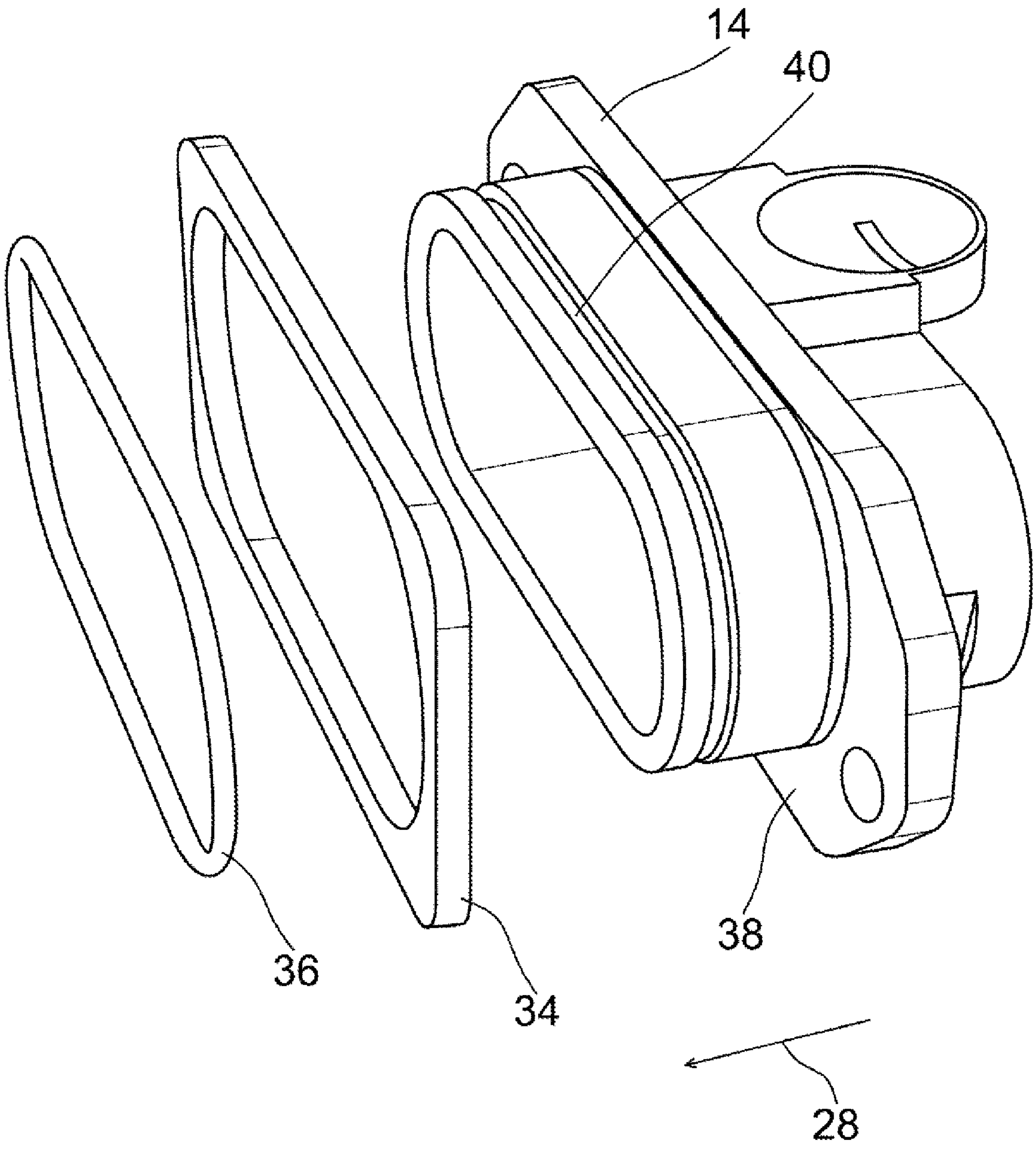
FIG. 4 shows a perspective illustration of an exemplary receiving element.
Figure 5:
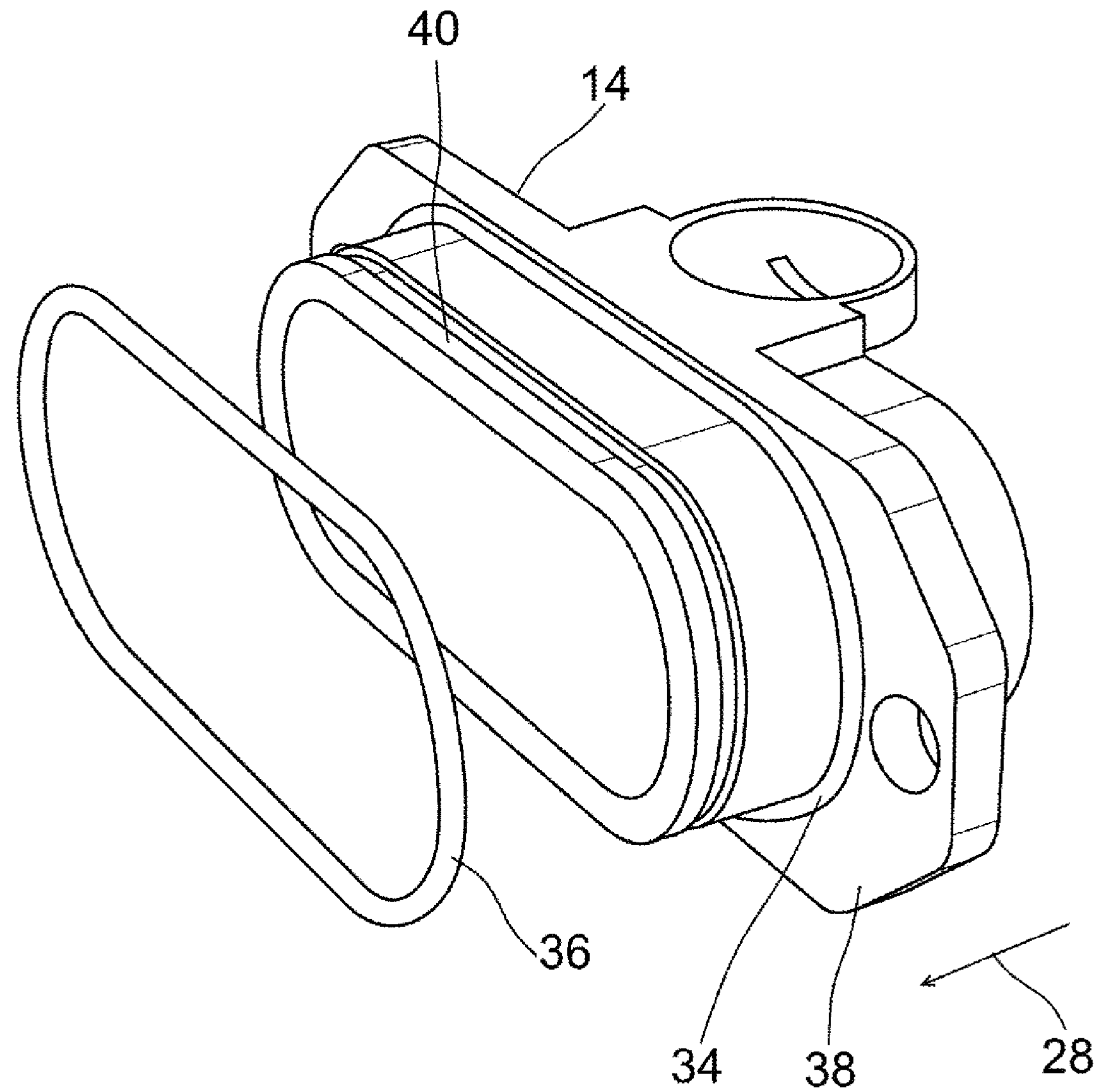
FIG. 5 shows a perspective illustration of an alternative receiving element.
Figure 6:
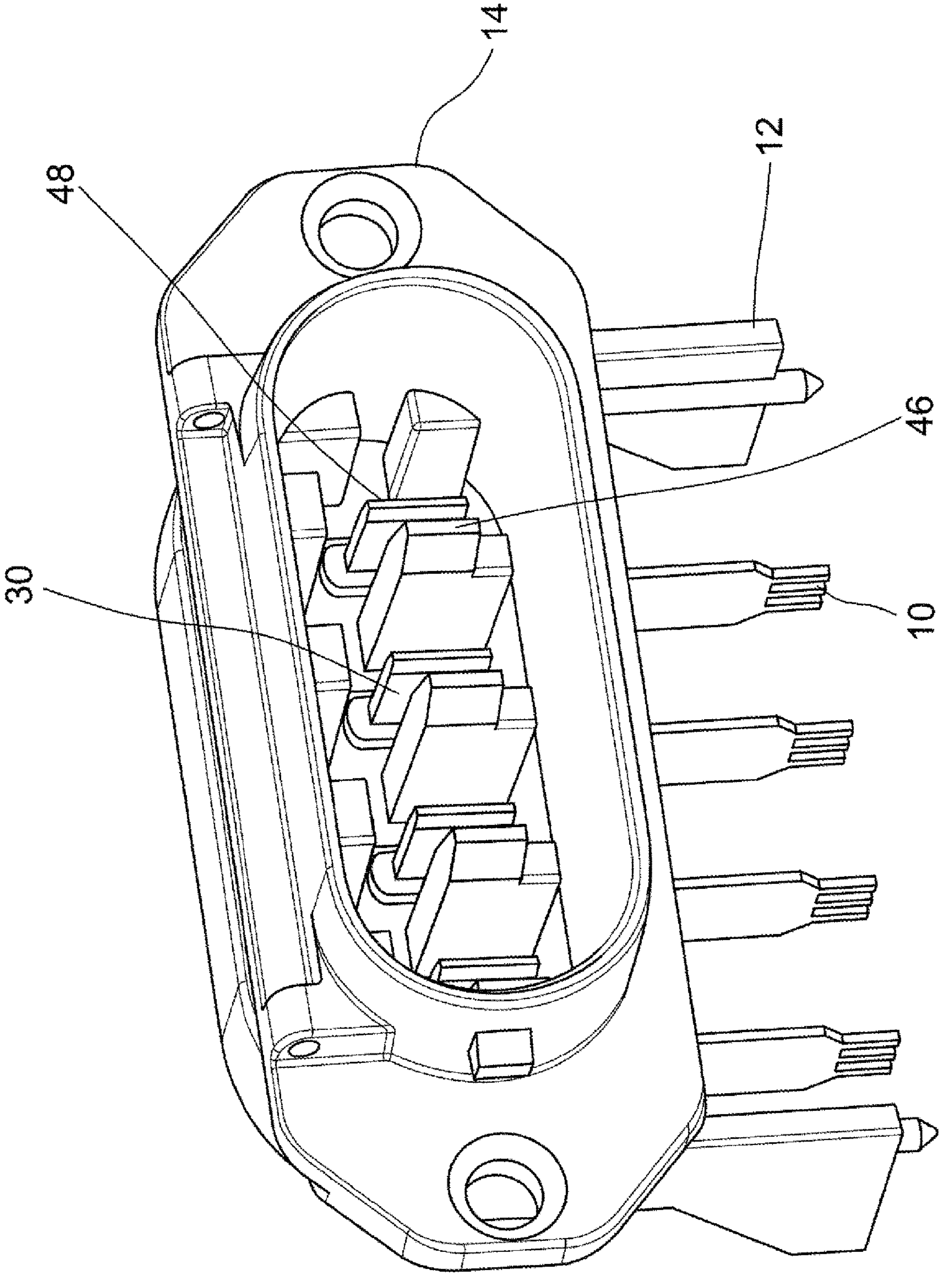
FIG. 6 shows a perspective illustration of an exemplary connector.
Figure 7:
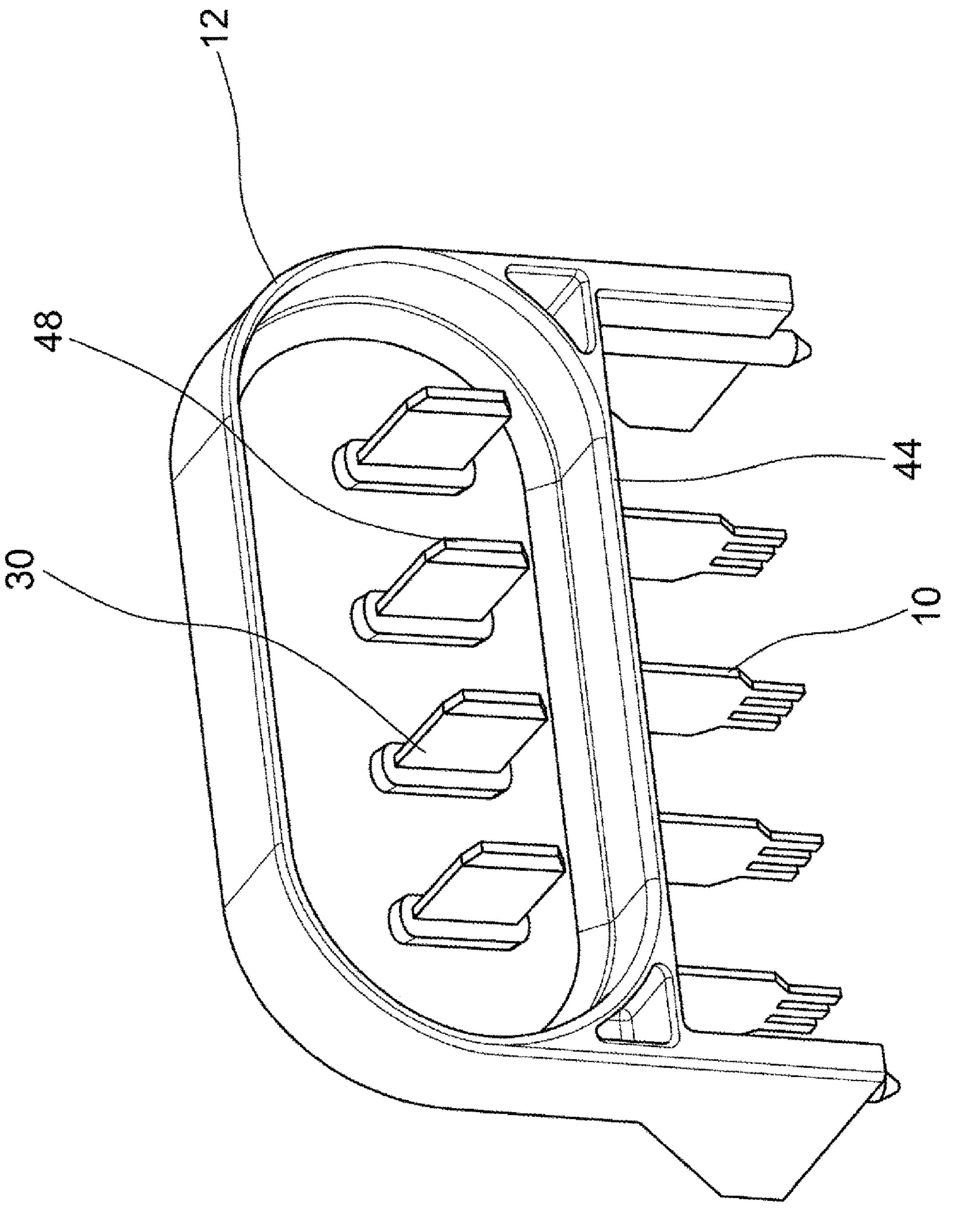
FIG. 7 shows the contact carrier element and the contact elements of the connector of FIG. 6.
Figure 8:
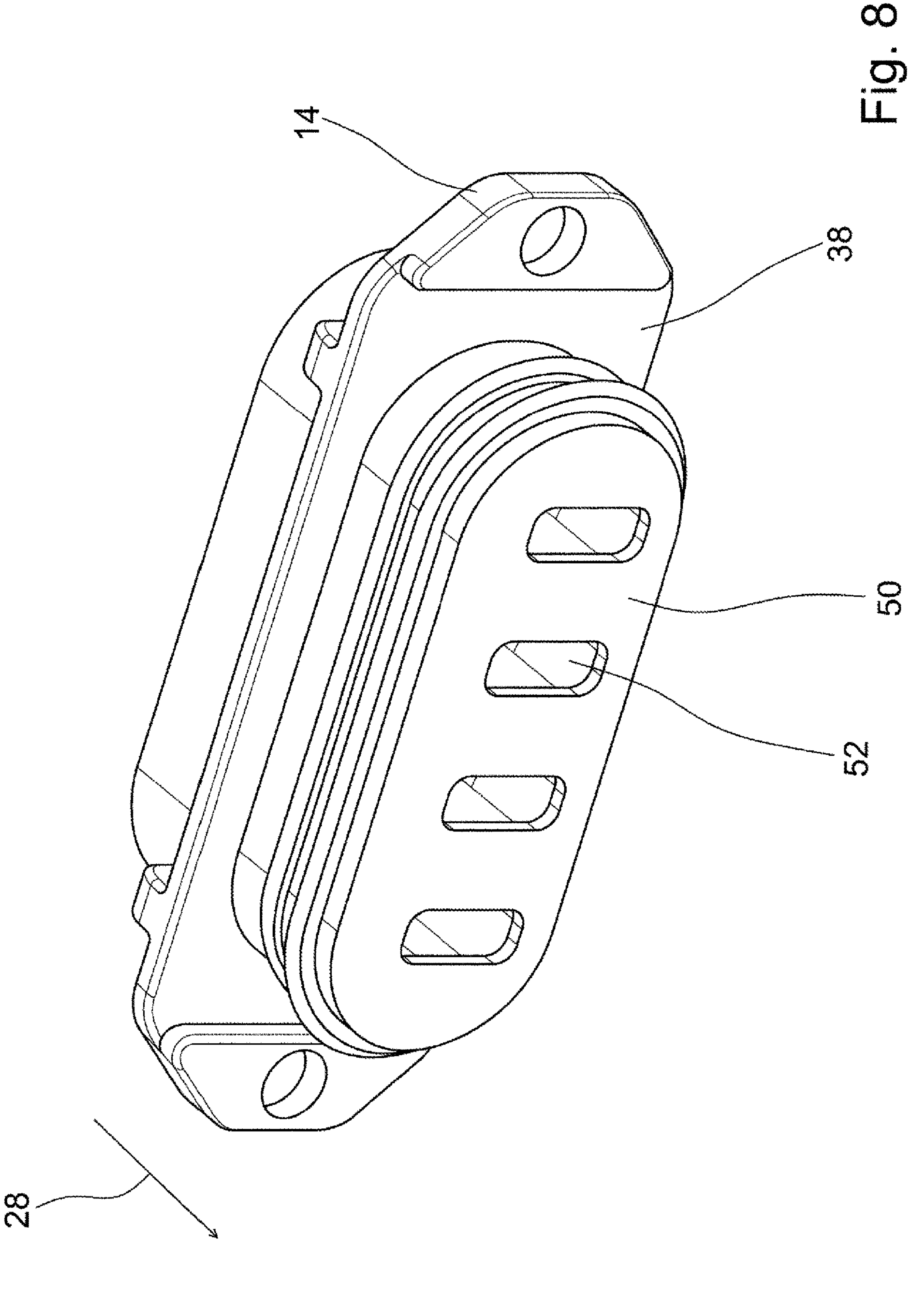
FIG. 8 shows the receiving element of the connector of FIG. 6.
Figure 9:
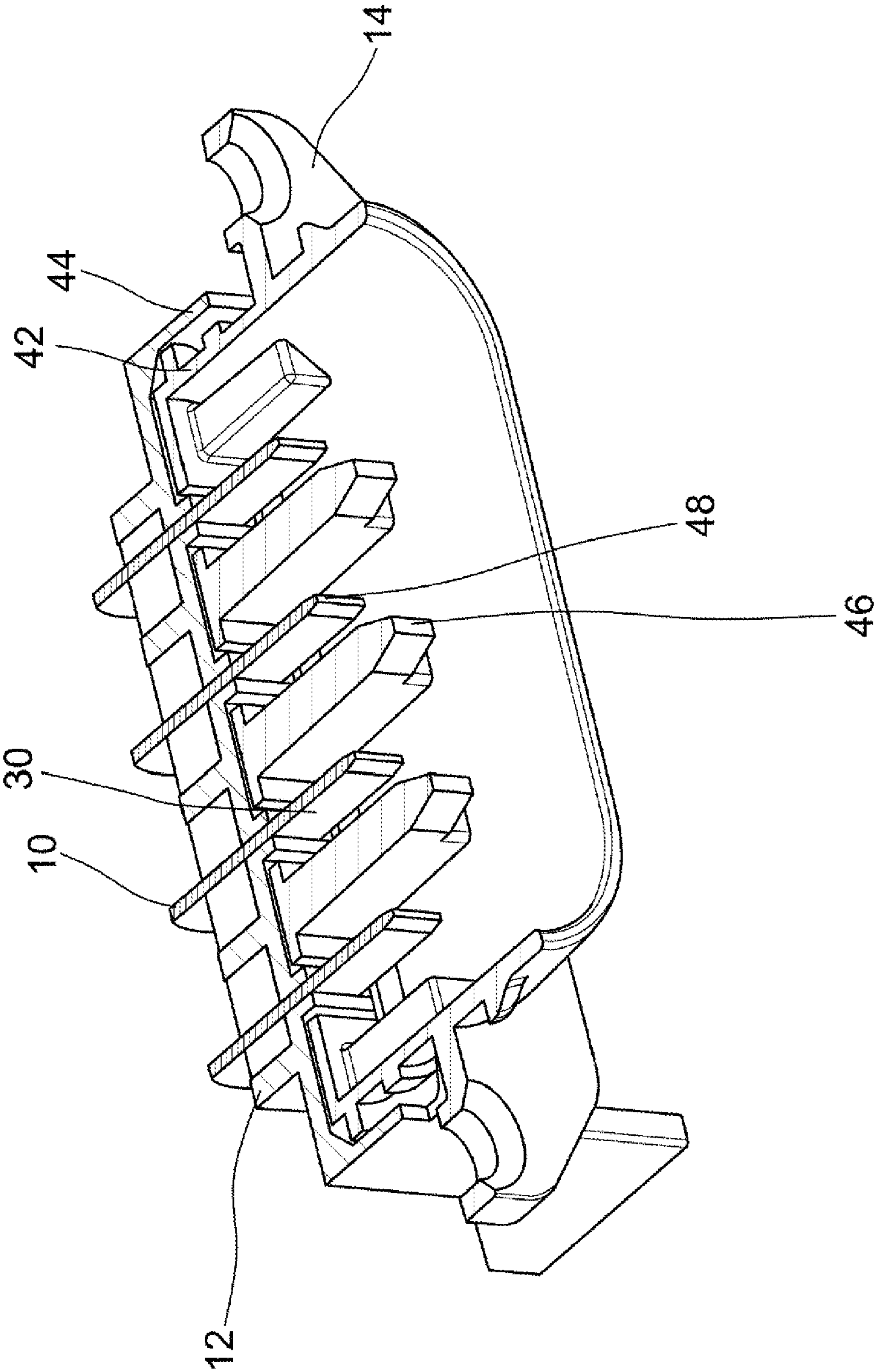
FIG. 9 shows a sectional illustration of the connector of FIG. 6.

FIGS. 4 and 5 show different possible exemplary embodiments of the receiving element 14 with the associated sealing elements 34, 36.

In the example illustrated in FIG. 4, the first sealing element 34 is configured as a flat seal and the second sealing element 36 is configured as an O ring seal.

In the example illustrated in FIG. 5, both the first sealing element 34 and the second sealing element 36 are configured as an O ring.

The exemplary receiving elements 14 shown in FIGS. 4 and 5 have a bearing surface 38 facing in the first direction 28 in the examples shown. As in the examples shown, the bearing surface 38 can face in the first direction 28. In particular in the case of the first sealing element 34 (shown in FIG. 4) which is designed as a flat seal, the bearing surface 38 can serve to press the sealing element 34 against the housing 18.

As shown in FIG. 5, a first sealing element 34 (shown in FIG. 5) which is designed as an O ring can likewise be arranged in the region of the bearing surface 38 so that the first sealing element 34 can be pressed against the housing 18 by the said bearing surface. A circumferential groove is particularly advantageously provided, in which the first sealing element 34 configured as an O ring is arranged. During the assembly of the connector, the first sealing element 34 can therefore be securely arranged on the receiving element 14 before the receiving element 14 is inserted into the housing 18.

The two second sealing elements 36 shown in FIGS. 4 and 5 are likewise arranged by way of example in grooves 40. The effect of the grooves 40, in particular, is that the second sealing elements 36 do not slip on the receiving element 14 along the first direction 28.

As in the example shown, the receiving element 14 can have a plug-in portion 42. In the examples shown, the grooves 40 are each arranged in the region of an outwardly facing surface of the plug-in portion 42.

As revealed in FIG. 3, the plug-in portion 42 can be plugged together with a plug-on portion 44 of the contact carrier element 12. In this case, the second sealing element 36 is advantageously squeezed between the plug-in portion 42 and the plug-on portion 44 and thus has a sealing effect. In this case, tolerance compensation can, in particular, take place along the first direction 28 in which the plug-in portion 42—depending on the actual relative position between the housing 18 and the contact carrier element 12—is pushed more or less deeply into the plug-on portion 44.

An exemplary connector is illustrated in FIGS. 6 to 9, wherein the drawing merely shows the contact elements 10, the contact carrier element 12 and the receiving element 14 in an isolated illustration. The at least one touch-protection element is particularly visible due to the isolation. As illustrated in the example shown, the receiving element 14 can have touch-protection elements 46 which extend finger-like into the receiving space contrary to the first direction 28. The touch-protection elements 46 form individual, substantially punctiform obstacles to prevent penetration by a body part. With regard to the present description, a punctiform obstacle should not be understood simply as a non-dimensional point in the mathematical sense, but as an obstacle which acts as an obstacle only in a small spatial sub-region of the receiving space—essentially point-wise. However, the plurality of touch-protection elements 46 forms a plurality of such punctiform obstacles which, together, thus form a barrier to prevent penetration by a body part.

As in the example shown, the contact elements 10 can alternatively and/or additionally have touch-protection elements 48. As in the example shown, these can be formed as electrically non-conductive end regions, in particular made from plastic, of the contact elements 10 extending with the contact regions 30 into the receiving space. Analogously to the touch-protection elements 46 described above, these can likewise form a barrier consisting of a plurality of punctiform obstacles. As in the example shown, such a barrier can also be jointly formed by the touch-protection elements 46, 48.

In the example shown, the touch-protection elements 46 are formed on a wall 50 of the receiving element 14 which faces the contact carrier element 12 when the connector is mounted. As in the example shown, the wall 50 can have openings 52 through which the contact elements 10 can enter by means of their contact regions 30. For better understanding, in FIGS. 7 and 8, the receiving element 14 on the one hand and the contact carrier 12 having the contact elements 10 on the other are again illustrated separately.

The features of the invention which are disclosed in the present description, in the drawings and in the claims can be essential to the realization of the invention in its various embodiments both individually and in any combinations. The invention is not restricted to the described embodiments. It can be varied within the scope of the claims and taking into account the knowledge of a person skilled in the art.

The invention claimed is:

1. An electrical connector for forming an electrical plug connection with a coupling which is complementary to the connector, comprising:
- a plurality of contact elements for electrically contacting an electrical apparatus arranged in a housing;
- a contact carrier element; and
- a receiving element for receiving the coupling in a receiving space surrounded by the receiving element,
  - wherein the receiving element can be inserted into the housing along a first direction through an opening in the housing,
  - wherein the receiving element can be brought into engagement with the contact carrier element along the first direction to form the connector,
  - wherein the contact elements are guided through the contact carrier element and have contact regions which extend into the receiving space contrary to the first direction, away from the contact carrier element, when the receiving element is brought into engagement with the contact carrier element, and
  - wherein the connector has at least one touch-protection element, which is arranged in the receiving space when the receiving element is brought into engagement with the contact carrier element and is designed to prevent a human body part, which penetrates into the receiving space from touching the contacting regions.

2. The connector as claimed in claim 1, wherein the receiving element has a plug-in portion and the contact carrier element has a plug-on portion which is complementary to the plug-in portion, or the contact carrier element has a plug-in portion and the receiving element has a plug-on portion which is complementary to the plug-in portion, and wherein the plug-in portion and the plug-on portion can be plugged together parallel to the first direction in order to bring the receiving element into engagement with the contact carrier element.

3. The connector as claimed in claim 1, wherein the at least one touch-protection element and/or at least one further touch-protection element extends finger-like in the receiving space contrary to the first direction when the receiving element is brought into engagement with the contact carrier element.

4. The connector as claimed in claim 1, wherein the at least one touch-protection element and/or at least one further touch-protection element is a component of the receiving element.

5. The connector as claimed in claim 1, wherein the receiving element has a movable cover for optionally closing and opening the receiving space.

6. The connector as claimed in claim 1, wherein the at least one touch-protection element and/or at least one further touch-protection element forms an end region of at least one of the contact elements, which end region faces contrary to the first direction.

7. An electrical plug connection having a connector as claimed in claim 1, and having a coupling which is complementary to the connector,
- wherein the at least one touch-protection element and/or at least one further touch-protection element is received in a receptacle of the coupling which is complementary to the touch-protection element when the coupling is pushed into the connector.

8. An electrical device having a housing and an electrical connector as claimed in claim 1, wherein the contact carrier element and the contact elements are connected to a circuit carrier element and the circuit carrier element is arranged within the housing,
- wherein the receiving element is inserted into the housing along a first direction through an opening in the housing,
- wherein the receiving element is brought into engagement with the contact carrier element to form the connector.

9. The device as claimed in claim 8, wherein the electrical device is an inverter to the direct voltage circuit of which the contact elements are electrically connected.

10. A method for producing an electrical device as claimed in claim 8, wherein the contact carrier element and the contact elements are connected to the circuit carrier element and the circuit carrier element is incorporated in the housing,
- wherein after the connection of the contact elements and the contact carrier element to the circuit carrier element, and after the incorporation of the circuit carrier element in the housing, the receiving element is inserted into the housing through the opening in the housing, wherein the receiving element engages with the contact carrier element and therefore forms the connector.

11. The connector as claimed in claim 1, wherein the human body part is a finger.

12. The connector as claimed in claim 4, wherein the at least one touch-protection element and/or at least one further touch-protection element is formed in one piece with the receiving element.

13. The connector as claimed in claim 5, wherein the cover is designed to secure the coupling received in the receiving space against removal along the first direction.

14. The connector as claimed in claim 8, wherein the circuit carrier element is a printed circuit board.

15. The connector as claimed in claim 9, wherein the inverter is an ancillary unit inverter for a motor vehicle.

16. The connector as claimed in claim 2, wherein the at least one touch-protection element and/or at least one further touch-protection element extends finger-like in the receiving space contrary to the first direction when the receiving element is brought into engagement with the contact carrier element.

17. The connector as claimed in claim 2, wherein the at least one touch-protection element and/or at least one further touch-protection element is a component of the receiving element.

18. The connector as claimed in claim 17, wherein the at least one touch-protection element and/or at least one further touch-protection element is a component of the receiving element.

19. The connector as claimed in claim 18, wherein the receiving element has a movable cover for optionally closing and opening the receiving space.

20. The connector as claimed in claim 19, wherein the cover is designed to secure the coupling received in the receiving space against removal along the first direction.

* * * * *